US012611750B2

(12) United States Patent
Lai

(10) Patent No.: US 12,611,750 B2
(45) Date of Patent: Apr. 28, 2026

(54) TORQUE WRENCH AND STANDALONE CALIBRATION METHOD THEREOF

(71) Applicant: Shih-Hao Lai, Taichung City (TW)

(72) Inventor: Shih-Hao Lai, Taichung City (TW)

( * ) Notice: Subject to any disclaimer, the term of this patent is extended or adjusted under 35 U.S.C. 154(b) by 353 days.

(21) Appl. No.: 18/455,375

(22) Filed: Aug. 24, 2023

(65) Prior Publication Data

US 2024/0335923 A1 Oct. 10, 2024

(30) Foreign Application Priority Data

Apr. 7, 2023 (TW) ................................ 112113156

(51) Int. Cl.
*B25B 23/142* (2006.01)
*B25B 13/46* (2006.01)

(52) U.S. Cl.
CPC ........ *B25B 13/462* (2013.01); *B25B 23/1425* (2013.01)

(58) Field of Classification Search
CPC ..... B25B 13/46; B25B 13/462; B25B 13/463; B25B 13/48; B25B 21/002; B25B 21/004; B25B 21/008; B25B 23/14; B25B 23/1422; B25B 23/1425; B25B 23/147; B23P 19/02; B23P 19/04; B23P 19/06; B23P 19/065; G01L 25/00
See application file for complete search history.

(56) References Cited

U.S. PATENT DOCUMENTS

2003/0094081 A1 5/2003 Becker et al.
2007/0119267 A1 5/2007 Anjanappa et al.
2007/0119269 A1 5/2007 Anjanappa et al.
2011/0303054 A1* 12/2011 Cattaneo ............ B25B 23/1425 81/479
2013/0291694 A1 11/2013 Gauthier et al.
2014/0165796 A1 6/2014 Gauthier et al.
2014/0260837 A1 9/2014 Gauthier et al.
2014/0331828 A1* 11/2014 King .................. B25B 23/1425 81/467
2014/0336810 A1* 11/2014 Li ......................... G05B 15/02 700/103
2015/0007699 A1* 1/2015 Lee .................... B25B 23/1425 81/180.1
(Continued)

FOREIGN PATENT DOCUMENTS

CN 105345718 A 2/2016
CN 102179791 B 8/2016
(Continued)

*Primary Examiner* — Robert J Scruggs
(74) *Attorney, Agent, or Firm* — MUNCY, GEISSLER, OLDS & LOWE, P.C.

(57) ABSTRACT

A torque wrench includes a body and a measuring device. The body has a driving portion disposed at one end thereof. The measuring device is coupled to the body and has a control panel, which is provided with a setting button and a display unit. The setting button is configured to be pressed to allow the measuring device to set a first compensation coefficient that is between 0.85 and 1.15. The measuring device is capable of measuring the torque of the driving portion to obtain a measured torque value and to display a compensated torque value on the display unit. The compensated torque value is the product of the measured torque value and the first compensation coefficient.

5 Claims, 4 Drawing Sheets

(56) References Cited

U.S. PATENT DOCUMENTS

| | | | |
|---|---|---|---|
| 2016/0256989 | A1 | 9/2016 | Gauthier et al. |
| 2018/0361547 | A1 | 12/2018 | Gauthier et al. |
| 2022/0266428 | A1 | 8/2022 | Boccellato et al. |
| 2022/0395969 | A1 | 12/2022 | Boccellato et al. |

FOREIGN PATENT DOCUMENTS

| | | | | | |
|---|---|---|---|---|---|
| EP | 0172120 | B1 * | 12/1987 | ......... | B25B 23/1425 |
| TW | 200904597 | A | 2/2009 | | |
| TW | 201249610 | A | 12/2012 | | |
| TW | I403392 | B | 8/2013 | | |
| TW | 201444651 | A | 12/2014 | | |
| TW | M497080 | U | 3/2015 | | |
| TW | 201614208 | A | 4/2016 | | |
| TW | 201742711 | A | 12/2017 | | |
| TW | 202017710 | A | 5/2020 | | |
| TW | 202135995 | A | 10/2021 | | |
| TW | 202206234 | A | 2/2022 | | |
| TW | 202210244 | A | 3/2022 | | |
| TW | M638718 | U | 3/2023 | | |

* cited by examiner

TORQUE WRENCH AND STANDALONE CALIBRATION METHOD THEREOF

BACKGROUND OF THE INVENTION

The present invention relates to a digital torque wrench and a standalone torque valve calibration method thereof.

Taiwan Patent No. M497080 discloses a calibration device for an electronic torque tool. The calibration device includes a measuring portion inserted into an electronic torsion tool and a driving handle portion. The measuring portion has one end recessed with a insertion slot sleeved on a driving portion of the electronic torsion tool. The driving handle portion has one end connected to one end of the measuring portion opposite to the insertion slot and is further provided with a transmission unit signally coupled to an electronic panel of the electronic torsion tool. Further, a signal conversion unit and a comparison unit are disposed in the driving handle portion. The signal conversion unit converts the actual torque value between the electronic torque tool and the measuring portion and transmits the value to the comparison unit. The comparison unit compares the actual torque value after conversion and the torque value shown on the electronic panel of the electronic torque tool, and further corrects the torque value shown on the electronic panel to meet the actual torque value.

The strain gauge commonly used in electronic torque tools is also a measuring instrument, which needs to undergo calibration to reduce measurement errors. When using the strain gauge to measure torque value, it requires a conversion between signals and data. If error correction is needed, it usually involves adjusting the calculation parameters within the measurement system. However, to change the measurement system's calculation parameters in an electronic torque tool, it is necessary to connect the electronic torque tool to a computer or calibration instrument through a signal cable. This process is not feasible for ordinary consumers or operators who lack access to calibration instrument and cannot be performed independently.

Thus, a need exists for a torque wrench to mitigate and/or obviate the above disadvantages.

SUMMARY OF THE INVENTION

In a first aspect, a torque wrench includes a body and a measuring device. The body has a driving portion disposed at one end thereof. The measuring device is coupled to the body and has a control panel. The control panel is provided with a setting button and a display unit. The setting button is configured to be pressed to allow the measuring device to set a first compensation coefficient that is between 0.85 and 1.15. The measuring device is capable of measuring the torque of the driving portion to obtain a measured torque value and to display a compensated torque value on the display unit. The compensated torque value is the product of the measured torque value and the first compensation coefficient.

In an embodiment, the setting button is further configured to be pressed to allow the measuring device to set a second compensation coefficient that is between 0.85 and 1.15. The measuring device is capable of setting a maximum torque value based on a rated maximum permissible torque of the driving portion. The measuring device is further capable of setting a first intermediate value that is greater than 0 and less than the maximum torque value. The measuring device is further capable of setting a first torque range and a second torque range based on the first intermediate value as a reference. The first torque range is greater than 0 and less than the first intermediate value. The second torque range is greater than the first intermediate value and less than the maximum torque value. When the measured torque value obtained by the measuring device falls within the first torque range, the compensated torque value displayed on the display unit is the product of the measured torque value and the first compensation coefficient. When the measured torque value obtained by the measuring device falls within the second torque range, the compensated torque value displayed on the display unit is the product of the measured torque value and the second compensation coefficient.

In an embodiment, the setting button is further configured to be pressed to allow the measuring device to set a third compensation coefficient that is between 0.85 and 1.15. The measuring device is further capable of setting a second intermediate value that is greater than the first intermediate value and less than the maximum torque value. The first intermediate value that is greater than 0 and less than the second intermediate value. The measuring device is further capable of setting a third torque range based on the second intermediate value as a reference. The torque value in the second torque range is greater than the first intermediate value and less than the second intermediate value. The third torque range is greater than the second intermediate value and less than the maximum torque value. When the measured torque value obtained by the measuring device falls within the third torque range, the compensated torque value displayed on the display unit is the product of the measured torque value and the third compensation coefficient.

In an embodiment, the first intermediate value is greater than 0.1 times the maximum torque value and less than 0.4 times the maximum torque value. The second intermediate value is greater than 0.5 times the maximum torque value and less than 0.8 times the maximum torque value.

In an embodiment, the display unit is configured to display a first interface, a second interface, and a third interface. The first interface displays a first code and a first parameter. The first code represents the code for the first torque range. The first parameter is used to calculate the first compensation coefficient. The second interface displays a second code and a second parameter. The second code represents the code for the second torque range. The second parameter is used to calculate the second compensation coefficient. The third interface displays a third code and a third parameter. The third code represents the code for the third torque range. The third parameter is used to calculate the third compensation coefficient.

In an embodiment, when the display unit displays the first interface, the setting button is configured to be pressed to allow the display unit to switch to the second interface. When the display unit display the second interface, the setting button is configured to be pressed to allow the display unit to switch to the third interface.

In a second aspect, a calibration method includes:

providing a torque wrench that includes a body and a measuring device coupled to the body, with the body having a driving portion disposed at one end thereof, with the measuring device having a control panel, which is provided with a setting button and a display unit;

pressing the setting button to allow the measuring device to set a first compensation coefficient that is between 0.85 and 1.15;

measuring the torque of the driving portion via the measuring device to obtain a measured torque value and a compensated torque value that is the product of the measured torque value and the first compensation coefficient;

displaying the compensated torque value on the display unit.

The present invention will become clearer in light of the following detailed description of illustrative embodiments of this invention described in connection with the drawings.

DETAILED DESCRIPTION OF THE INVENTION

Figure 1:
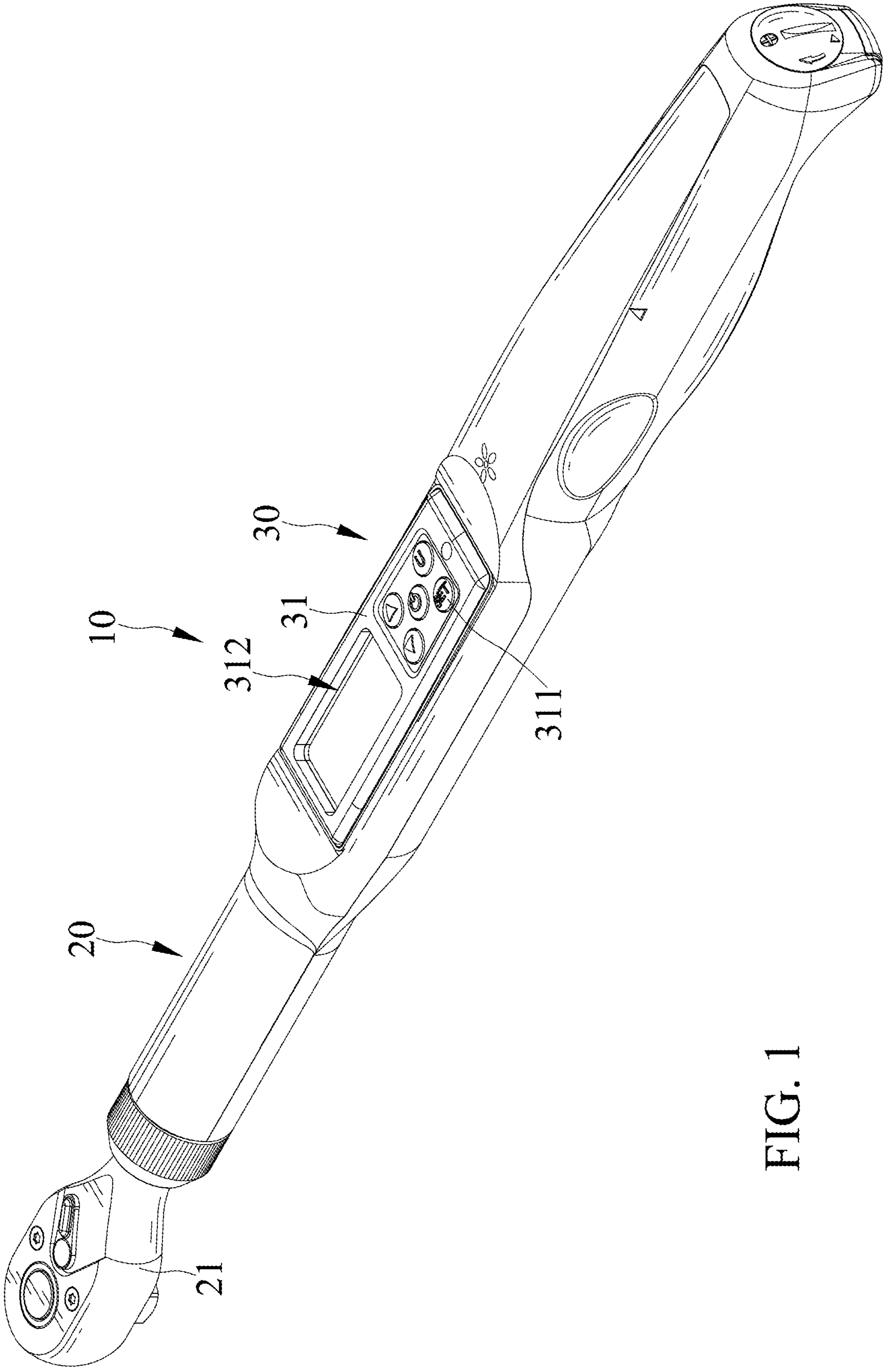
FIG. 1 is a perspective view of a torque wrench of an embodiment according to the present invention.

FIGS. 1-4 show a torque wrench 10 of an embodiment according to the present invention. The torque wrench 10 includes a body 20 and a measuring device 30.

The body 20 has a driving portion 21 disposed at one end thereof.

The measuring device 30 is coupled to the body 20 and has a control panel 31. The control panel 31 is provided with a setting button 311 and a display unit 312. The setting button 311 is configured to be pressed to allow the measuring device 30 to set a first compensation coefficient that is between 0.85 and 1.15. The measuring device 30 is capable of measuring the torque of the driving portion 21 to obtain a measured torque value and to display a compensated torque value on the display unit 312. The compensated torque value is the product of the measured torque value and the first compensation coefficient.

The setting button 311 is further configured to be pressed to allow the measuring device 30 to set a second compensation coefficient that is between 0.85 and 1.15. The measuring device 30 is capable of setting a maximum torque value based on a rated maximum permissible torque of the driving portion 21. The measuring device 30 is further capable of setting a first intermediate value that is greater than 0 and less than the maximum torque value. The measuring device 30 is further capable of setting a first torque range and a second torque range based on the first intermediate value as a reference. The first torque range is greater than 0 and less than the first intermediate value. The second torque range is greater than the first intermediate value and less than the maximum torque value. When the measured torque value obtained by the measuring device 30 falls within the first torque range, the compensated torque value displayed on the display unit 312 is the product of the measured torque value and the first compensation coefficient. When the measured torque value obtained by the measuring device 30 falls within the second torque range, the compensated torque value displayed on the display unit 312 is the product of the measured torque value and the second compensation coefficient.

The setting button 311 is further configured to be pressed to allow the measuring device 30 to set a third compensation coefficient that is between 0.85 and 1.15. The measuring device 30 is further capable of setting a second intermediate value that is greater than the first intermediate value and less than the maximum torque value. The first intermediate value that is greater than 0 and less than the second intermediate value. The measuring device 30 is further capable of setting a third torque range based on the second intermediate value as a reference. The torque value in the second torque range is greater than the first intermediate value and less than the second intermediate value. The third torque range is greater than the second intermediate value and less than the maximum torque value. When the measured torque value obtained by the measuring device 30 falls within the third torque range, the compensated torque value displayed on the display unit 312 is the product of the measured torque value and the third compensation coefficient.

Further, the first intermediate value is greater than 0.1 times the maximum torque value and less than 0.4 times the maximum torque value. The second intermediate value is greater than 0.5 times the maximum torque value and less than 0.8 times the maximum torque value.

The display unit 312 is configured to display a first interface F1, a second interface F2, and a third interface F3. The first interface F1 displays a first code M1 and a first parameter P1. The first code M1 represents the code for the first torque range. The first parameter P1 is used to calculate the first compensation coefficient. The second interface F2 displays a second code M2 and a second parameter P2. The second code M2 represents the code for the second torque range. The second parameter P2 is used to calculate the second compensation coefficient. The third interface F3 displays a third code M3 and a third parameter P3. The third code M3 represents the code for the third torque range. The third parameter P3 is used to calculate the third compensation coefficient.

When the display unit 312 displays the first interface F1, the setting button 311 is configured to be pressed to allow the display unit 312 to switch to the second interface F2. When the display unit 312 display the second interface F2, the setting button 311 is configured to be pressed to allow the display unit 312 to switch to the third interface F3.

The relationship between the first compensation coefficient X1 and the first parameter P1 may be expressed as the following equation 1:

$$X1 = 100\% + P1 \times 100\% \tag{1}$$

The relationship between the second compensation coefficient X2 and the second parameter P2 may be expressed as the following equation 2:

$$X2 = 100\% + P2 \times 100\% \tag{2}$$

The relationship between the third compensation coefficient X3 and the third parameter P3 may be expressed as the following equation 3:

$$X3 = 100\% + P3 \times 100\% \tag{3}$$

Figure 2:
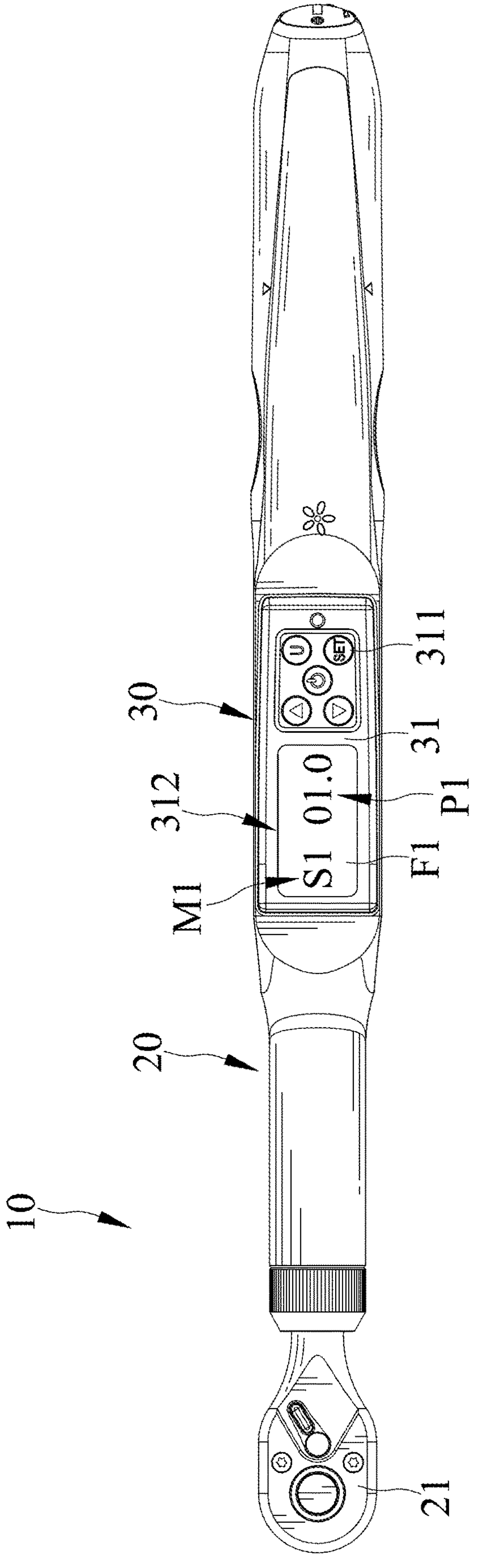
FIG. 2 is a plan view of the torque wrench of FIG. 1 and shows a display unit displaying a first interface.
Figure 3:
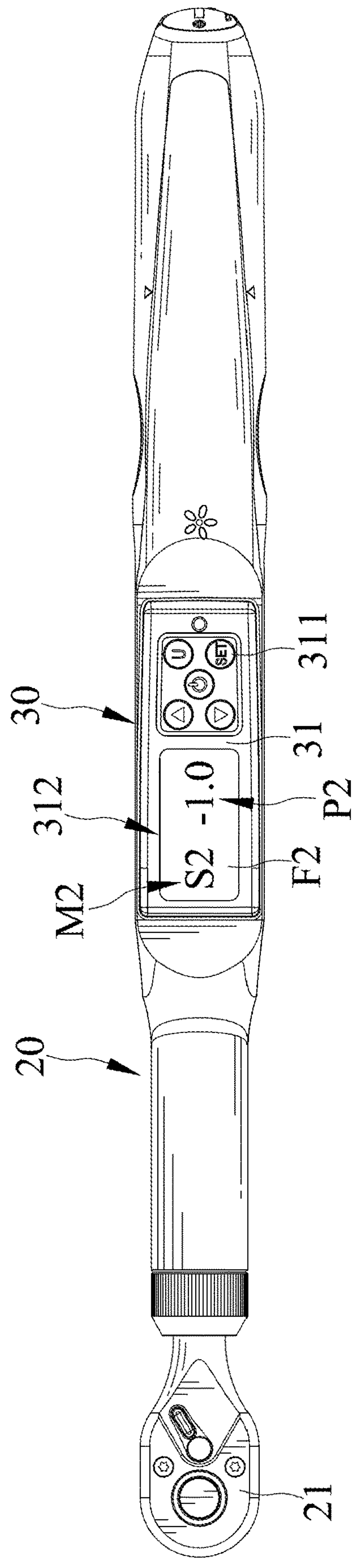
FIG. 3 is another plan view of the torque wrench of FIG. 1 and shows the display unit displaying a second interface.
Figure 4:
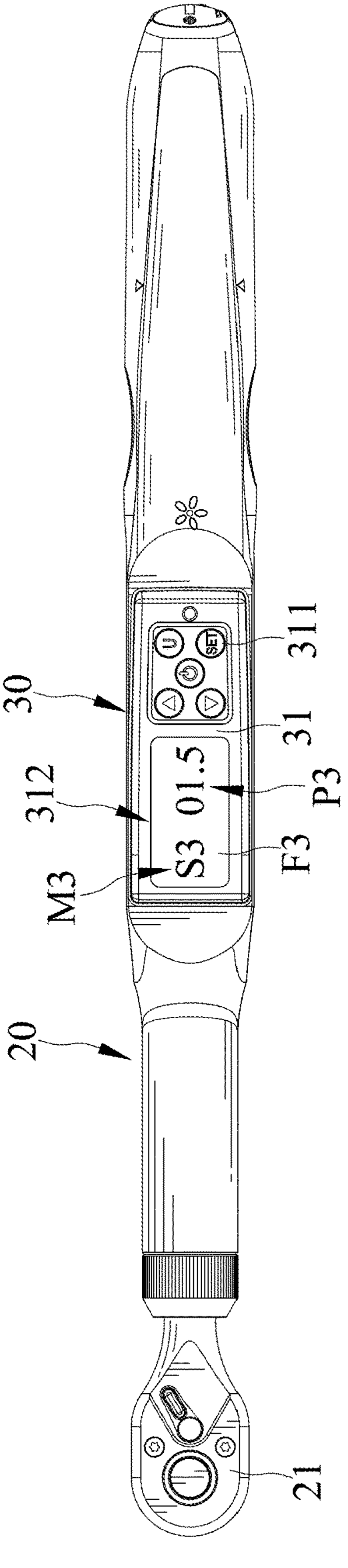
FIG. 4 is another plan view of the torque wrench of FIG. 1 and shows the display unit displaying a third interface.

In this embodiment, the first code M1 is exemplified as S1, and the first parameter P1 is exemplified as 1.0 (as shown in FIG. 2). The first compensation coefficient is calculated to be 1.01. The second code M2 is exemplified as S2, and the second parameter P2 is exemplified as −1.0 (as shown in FIG. 3). The second compensation coefficient is calculated to be 0.99. The third code M3 is exemplified as S3, and the third parameter P3 is exemplified as 1.015 (as shown in FIG. 4).

For example, if the maximum torque value is 200 Nm, the first intermediate value may be 40 Nm, and the second intermediate value may be 120 Nm. When the torque value obtained by the measuring device 30 for measuring the torque of the driving portion 21 is less than 40 Nm, the compensated torque value displayed on the display unit 312 is the measured torque value multiplied by 1.01. When the torque value obtained by the measuring device 30 for measuring the torque of the driving portion 21 is greater than 40 Nm and less than 120 Nm, the compensated torque value displayed on the display unit 312 is the measured torque value multiplied by 0.99. When the torque value obtained by the measuring device 30 for measuring the torque of the driving portion 21 is greater than 120 Nm and less than 200 Nm, the compensated torque value displayed on the display unit 312 is the measured torque value multiplied by 1.015.

Thus, the torque wrench 10 allows to be calibrated through operation on the body 20. When the user detects a discrepancy between the displayed torque value of the torque wrench 10 and the actual output, the user can directly correct the discrepancy through operation on the body 20 of the torque wrench 10, without the need for additional external computers or other calibration instruments, thereby enhancing the convenience of calibration.

Although specific embodiments have been illustrated and described, numerous modifications and variations are still possible without departing from the scope of the invention. The scope of the invention is limited by the accompanying claims.

The invention claimed is:

1. A torque wrench, comprising:

a body having a driving portion disposed at one end thereof; and a measuring device coupled to the body and having a control panel, wherein the control panel is provided with a setting button and a display unit, wherein the setting button is configured to be pressed to allow the measuring device to set a first compensation coefficient that is between 0.85 and 1.15, wherein the measuring device is capable of measuring the torque of the driving portion to obtain a measured torque value and to display a compensated torque value on the display unit, and wherein the compensated torque value is the product of the measured torque value and the first compensation coefficient, wherein the setting button is further configured to be pressed to allow the measuring device to set a second compensation coefficient that is between 0.85 and 1.15, wherein the measuring device is capable of setting a maximum torque value based on a rated maximum permissible torque of the driving portion, wherein the measuring device is further capable of setting a first intermediate value that is greater than 0 and less than the maximum torque value, wherein the measuring device is further capable of setting a first torque range and a second torque range based on the first intermediate value as a reference, wherein the first torque range is greater than 0 and less than the first intermediate value, and wherein the second torque range is greater than the first intermediate value and less than the maximum torque value;

wherein when the measured torque value obtained by the measuring device falls within the first torque range, the compensated torque value displayed on the display unit is the product of the measured torque value and the first compensation coefficient; and wherein when the measured torque value obtained by the measuring device falls within the second torque range, the compensated torque value displayed on the display unit is the product of the measured torque value and the second compensation coefficient.

2. The torque wrench as claimed in claim 1, wherein the setting button is further configured to be pressed to allow the measuring device to set a third compensation coefficient that is between 0.85 and 1.15, wherein the measuring device is further capable of setting a second intermediate value that is greater than the first intermediate value and less than the maximum torque value, wherein the first intermediate value that is greater than 0 and less than the second intermediate value, wherein the measuring device is further capable of setting a third torque range based on the second intermediate value as a reference, wherein the torque value in the second torque range is greater than the first intermediate value and less than the second intermediate value, wherein the third torque range is greater than the second intermediate value and less than the maximum torque value;

wherein when the measured torque value obtained by the measuring device falls within the third torque range, the compensated torque value displayed on the display unit is the product of the measured torque value and the third compensation coefficient.

3. The torque wrench as claimed in claim 2, wherein the first intermediate value is greater than 0.1 times the maximum torque value and less than 0.4 times the maximum torque value, and wherein the second intermediate value is greater than 0.5 times the maximum torque value and less than 0.8 times the maximum torque value.

4. The torque wrench as claimed in claim 2, wherein the display unit is configured to display a first interface, a second interface, and a third interface, wherein The first interface displays a first code and a first parameter, wherein the first code represents the code for the first torque range, wherein the first parameter is used to calculate the first compensation coefficient, wherein the second interface displays a second code and a second parameter, wherein the second code represents the code for the second torque range, wherein the second parameter is used to calculate the second compensation coefficient, wherein the third interface displays a third code and a third parameter, wherein the third code represents the code for the third torque range, and wherein the third parameter is used to calculate the third compensation coefficient.

5. The torque wrench as claimed in claim 4, wherein when the display unit displays the first interface, the setting button is configured to be pressed to allow the display unit to switch to the second interface;

wherein when the display unit display the second interface, the setting button is configured to be pressed to allow the display unit to switch to the third interface.

* * * * *